United States Patent [19]

Frosch

[11] Patent Number: 5,144,149
[45] Date of Patent: Sep. 1, 1992

[54] ELECTRICAL SIGNAL TO THERMAL IMAGE CONVERTER

[76] Inventor: Henry A. Frosch, 6200 Wilson Blvd. Apt. 809, Falls Church, Va. 22044

[21] Appl. No.: 644,031

[22] Filed: Jan. 22, 1991

[51] Int. Cl.$^5$ .............................................. G21F 4/00
[52] U.S. Cl. ................................... 250/493.1; 250/330
[58] Field of Search .................. 250/316.1, 330, 493.1, 250/495.1

[56] References Cited

U.S. PATENT DOCUMENTS

| | | | |
|---|---|---|---|
| 4,329,583 | 5/1982 | Conrad | 250/330 |
| 4,591,717 | 5/1986 | Scherber | 250/330 |
| 4,820,929 | 4/1989 | Modisette et al. | 250/493.1 |
| 4,868,768 | 9/1989 | Draggoo et al. | 250/330 |
| 4,886,972 | 12/1989 | Nakai et al. | 250/493.1 |
| 5,012,112 | 4/1991 | Flint et al. | 250/493.1 |

Primary Examiner—Bruce C. Anderson

[57] ABSTRACT

A device for converting video or other electronic input signals to thermal images, using a beam of energy (1000) to selectively heat areas of a target (60). The target (60) is composed of a multiplicity of elements (604) placed fortuitously on a substrate (602), which serves as a heat sink. It is intended for simulation, testing and training applications on systems employing infrared sensors.

12 Claims, 5 Drawing Sheets

ELECTRICAL SIGNAL TO THERMAL IMAGE CONVERTER

BACKGROUND

1. Field of the Invention

This invention relates to the field of thermal simulation devices which produce synthetic images for testing, evaluating and training on infrared imaging and non-imaging devices. The purpose of this invention is to produce real-time thermal imagery from video, computer and similar sources of electrical signals. The images that it produces are used for testing, evaluating, and training on a variety of infrared imaging systems which are employed in direct viewing, remote viewing, and as input to automatic target trackers, target recognizers, missile seekers, etc.

2. Description of Prior Art

The need for simulation systems
Devices to be tested

There are two regions of the infrared spectrum which are used for imaging: the near infrared, which begins at the end of the visible spectrum, and continues to about 1.35 micrometers, and the thermal infrared, which begins at about 3 micrometers and extends from there to greater than 30 micrometers. The thermal infrared is so called because these are the wavelengths at which there is significant emission from objects near to room temperature. The near infrared systems usually employ energy reflected from the objects under observation, unless they are at very high temperatures. The invention described herein will work from at least the visible to the far thermal infrared wavelengths, but the initial applications are in the thermal infrared. An understanding of the operation in this portion of the spectrum will be readily extended to other wavelengths by any practitioner familiar with the art.

There have been many approaches to the detection of thermal infrared energy: one class is that of thermal detectors, which include bolometric (thermocouples, thermopiles), thermovoltaic (thermistors), thermopneumatic (Golay cells), and rate-of-change (pyroelectric) detectors. Of these, only pyroelectric detectors (mainly in the form of pyroelectric vidicons, but also in semiconductor arrays) are used extensively in imaging applications.

The other class is that of the photon detectors. Here there are three variants: photoconductive, in which absorbed incident infrared photons cause a change in the resistance of the detector material; photovoltaic, which have a p-n junction which separates impinging photons, producing an electric current; and photoemissive, in which an incident photon is absorbed by a sensitive surface, giving up its energy to an electron at or near the surface. Some electrons, while giving up some of their energy, still have enough remaining to escape from the surface. If an anode is placed near to the sensitive (cathode) surface in a partially evacuated envelope, the freed electrons will flow to the anode and current will flow. Again, of these, only the first two are generally used for thermal imaging.

In an imaging infrared system there are two detector configurations: in one, a fixed, two-dimensional matrix array of detectors has the entire scene focused on it. The incoming energy is then integrated by the elements. These are then scanned electrically, a process which resets them to their initial state. This is repeated for each field. The pyroelectric vidicon and the focal plane array of photovoltaic detectors are examples of this arrangement.

In the second configuration, there is a point detector or an array of point detectors, which sample a narrow angle, called their instantaneous field of view (IFOV). In order to cover the entire field of view of the device, these detectors or arrays of detectors are scanned. The image of the scene is moved over the detectors in a pattern which enables them to cover all of the pixels within the desired field of view. In such a system, the detectors must have very little integration capability (i.e., they must have a short time constant), or smearing degrades the system resolution. This configuration is represented by serial-scan, by swath-scan, by parallel-scan, and by partially depopulated focal plane array imaging systems. In all of these, there are fewer detector elements than there are pixels in the output image.

The highest ratio of pixels to detectors occurs in the serial-scanned systems. In the basic design, there is a single point detector, and the image of the scene is moved across it. The typical pattern used is a raster scan, with the image read in from left to right, top to bottom as in a standard video system. Great uniformity in the resulting image is possible as the same detector is used to produce each pixel intensity.

A variant of the serial-scan system is an arrangement of individual detectors in a row. As the individual pixels in the image move over the IFOV of the detectors, they are added in sequence and averaged, yielding an effective integration proportional to the number of detectors. This is called a time-delay and integrate (TDI) detector array, and is used to increase the signal-to-noise ratio. A further extension of this technique employs a single rectangular detector one pixel high and several pixels long, with its long axis parallel to the scan direction and transport the electrons electrically with a bias current. These are called "sprite" detectors.

The swath-scan system can be thought of as an extension of the serial-scan system. In these, instead of a single detector, there is a column of a number of detectors. The image is scanned across these and covers strips of the image. These detectors can also be arrayed in TDI. Sprite detectors are used similarly.

The parallel-scan system employs a column of detectors as high as the image. The image is moved across these, and one field is formed with each scan. In most systems, they are moved horizontally, but some do sweep vertically, with the detectors arranged in a row instead of in a column. Some systems scan unidirectionally: others collect data in two directions. Each field can represent a frame, or interlace can be provided to combine more than one field in a frame. In systems which a field and frame are identical, it is a common practice to configure the detectors in two columns, with the second column staggered by a distance equal to half the pitch of the detector spacing. TDI or sprite detectors can also be used in parallel-scanned systems.

The characteristics of the detectors described above affect the usefulness and the difficulty of using dynamic infrared image simulation systems.

The new requirements

Established procedures for testing infrared sensors exist. Test personnel employ a number of stimuli to test them. These range from wholly synthetic images, such as bar targets and other geometrical patterns, to actual live targets in natural scenes. Objective tests of such parameters as Modulation Transfer Function, Minimum Resolvable Temperature Difference, Resolution, etc. use the geometric patterns.

Experience has shown that the these do not model the complexities of the natural environment adequately. They are static, which reduces their value considerably. To provide a comprehensive evaluation, knowledgeable testers resort to viewing natural scenes before judging a given system to be acceptable. Thus, the recognized need for repeatable imagery of natural scenes. That is, recorded imagery, reproduced in a consistent fashion while retaining the same radiometric attributes.

It is highly desirable to test entire systems' performance, as there are sometimes unexpected and often subtle interactions between the individual components. This is done by observing and measuring the output while inputing an image.

While a test system like this is very useful with present IR sensors, it will be essential for testing focal-plane array systems, automatic target recognizers, imaging seekers and trackers. Combinations of these functions will further increase its value.

With the present generation of IR sensors, it is possible to separate the detector from the balance of the sensor. Thus, it is feasible to inject electronic representations of imagery into the input of, say, a target recognizer to perform at least a rudimentary evaluation of performance. Even here, artifacts in the front-end electro-optical system can seriously compromise the validity of results so obtained.

Future systems will not allow even this luxury, and, as integration of processing functions on the focal plane inevitably progresses, an end-to-end test will be required. In such a test system, the images must be not only dynamic, they must also simulate background and clutter.

Earlier, when night vision imagery was collected from image intensifier devices, the primary recording medium was still or motion picture film. This has been supplanted almost entirely by video tape and computer-generated imagery (CGI).

Video tape has many advantages, including:
 a. Ease of operation.
 b. Consistency of performance.
 c. Ease of interface.
 d. The ability to be reviewed immediately after a recording, without processing.

The advent of the Digital Scan Converter and High Bit Rate Digital Recording systems extend the capability of analog video recording. They permit recording extremely wide dynamic range, high resolution, high quality infrared imagery.

Interactive computer-generated imagery (CGI) has all of the advantages of digital recording, and more. Test planners are no longer forced to cover a single pre-recorded path when simulating a flight. The computer accepts the simulated position data and generates the appropriate video. This, too, has a price. CGI is not quite as realistic as actual recorded scene data. Continuing improvement in hardware and in algorithms is mitigating that, however.

The principal advantage provided by the electrical signal to thermal image converter is to permit the system evaluator to use video data from either recorded or computer sources directly as the source medium when performing end-to-end testing of an IR sensor system. It is fully compatible with all of the sensor approaches described, and all existing or known proposed configurations.

Approaches for producing dynamic infrared images

There are five basic approaches to generating dynamic infrared images for testing or simulation:
 1. Arrays of heated filaments or thermal elements
 2. Thermal transducers
 3. Light valve systems
 4. Direct writing on the detector
 5. Phosphors Heated element arrays In the first approach, a matrix of individually addressable heated elements is used to generate an image. Various methods of producing these elements have been tried, from composition resistors to wire filaments to semiconductor junctions. One such device is that of Daehler, U.S. Pat. No. 4,724,356, Feb. 9, 1988. Another is the system manufactured by Electro-Optek Corporation, Torrance, Calif. A third has been made by the Sowerby Research Center of British Aerospace plc, Bristol, England. They suffer from several limitations:
 1. They generally have limits in their temperature range. At the high end, materials and current requirements predominate, especially in semiconductor implementations. At the low end, it is difficult, and sometimes impossible to produce low background temperatures for certain applications.
 2. They must be addressed individually, and some storage system must be provided to preserve temperature uniformity. As spatial resolution requirements increase, the complexity of the drive system scales. A $1000 \times 1000$ element array needs 1,000,000 addressable elements, each controllable to a number of levels of intensity. A system with a 60 dB dynamic range demands 10 bits per pixel or, in the case above, a total of 10,000,000 bits.
 3. They are prone to errors in output intensity from pixel to pixel, and especially to catastrophic failure of individual elements.
 4. They usually have relatively low fill-factor (ratio of active to inactive area).
 5. It is difficult to maintain adequate uniformity in all of the elements of such an array.

Thermal transducers—employing visible light to infrared conversion

In the second approach, the pioneer was the Bly Cell (U.S. Pat. Nos. 4,178,514, Dec. 11, 1979, System for Generating a Dynamic Far Infrared Image, and 4,299,864, Nov. 10, 1981, Method for Making Visible Light to Far Infrared Transducer, by Vincent T. Bly of Alexandria, Va.). This is a thin membrane of film having relatively low thermal conductivity, coated with materials which absorb energy in the form of visible light on one side, causing the membrane to heat, and then to emit on the other side far-infrared energy in accordance with Planck's law. The pattern of visible light projected on one side is transduced into a thermal pattern on the opposite side of the film. Because a graybody area emitter is selectively heated to form the image, the spectra of the emissions correspond closely to Planck's curve.

Although this is an elegantly simple approach, its limitations have restricted its usefulness. Some of the more critical of these are:
 1. It has low conversion efficiency, which causes it to demand a very high intensity visible image, precluding the use of coupling to cathode-ray-tubes and the like, and requiring instead a film-based motion picture projector. This, in turn, rules out interactive systems, and is clumsy and awkward even for fully scripted simulations.

2. It has limited high temperature capability. This is a result of the characteristics of the materials used for both the diaphragm and its coatings, which have a low temperature threshold before damage occurs.
3. It has limited low temperature capability because of radiative-only transfer to surrounding elements which are at approximately room temperature. Coupled with the upper temperature limit described above, this yields a maximum ΔT of about 35° C.
4. Lateral conduction through the diaphragm materials limits spatial resolution.
5. Constraints set by the mass of the diaphragm and its coatings, combined with reliance solely on radiative heat loss allows the designer only minimal control over the time-constant of the transducer.

Another approach is that of Modisette et al in U.S. Pat. No. 4,820,929. Here they have a cell comprised of a matrix of silicon diodes formed by dividing a silicon wafer, and placing on its front surface an extremely thin layer of metallized insulator, the metal used for ohmic contact, and a thicker metallic heat sink on the back. The thickness of the metal is such that it is transparent. In operation, a bias is impressed on the diodes. A visible image is projected on the matrix. The diodes conduct in proportion to the light impinging on them. Because they are short-circuited to the supply and return rails, maximum current flows, and its drop across the resistance of the conducting diode causes the diode to heat. This heat is transferred to the front surface and is radiated as an infrared image corresponding to the visible image on its surface.

Modisette et al claim that this system can be used with a laser projector. Unlike a CRT or a film projector, a laser illuminates only a single pixel at a time. It has no integration capability such as exists in the phosphor of the CRT. Neither has Modisette's device. The output power to raise the temperature of a single pixel 0.002 cm×0.001 cm is stated to be four mW. This is a steady-state power requirement, applicable when the entire cell is illuminated for the whole frame period. However, in raster-scanning systems such as laser projectors, only a single pixel is illuminated at a given time. The beam is swept across the target in a regular pattern or raster to form the image. In the case of a CRT, the phosphor has temporal rise and fall times which are used to maintain the image on the screen after the beam has moved on. This, in conjunction with the integration characteristics of the eye enable us to see a whole image on a television screen rather than a series of meaningless lines. A laser system has no comparable storage mechanism, and must rely wholly on the eye to integrate the image satisfactorily to the viewer. When it is used to address the Dynamic Infrared Simulation Cell of Modisette, there is no integration mechanism in either the laser source or in the Cell. This has two implications if the Cell is driven with a laser projector: The Cell will be unusable with such imaging infrared devices such as the U.S. Military Tri-Service common module FLIR, which employs a linear detector with up to 180 elements in a column. The image is swept left and right over the detector by a scanning mirror. There is also no storage mechanism in the FLIR to store an image. It can be seen that the laser-driven cell as taught will not provide a satisfactory image to such an infrared imaging device. The only input will be obtained when the detector of the FLIR happens to intercept the active pixel of the cell. The result will be a pattern that looks like an "X" or a lazy "V," depending on the degree and phase of synchronization. A similar problem was identified during the development of the common module FLIR. In that case, the Army wished to view the output of the FLIR, which was generated by imaging an LED array connected one-to-one with the detectors through an amplifier chain on the backside of the FLIR scanning mirror, with a vidicon camera. The artifact described above was observed. In this case, a faint scene image was also present in the background, because the vidicon did have some integration inherent in the photocathode. The problem was identified by Mr. Richard Franseen of the Army's Night Vision Laboratory, and was minimized by increasing the time constant of the vidicon. No similar technique is taught in the Modisette patent.

An even more serious problem is that of duty cycle. As stated above, each pixel requires four Mw to maintain a temperature of 100° C. This is a steady-state power. However, if the image is a serial scanned raster, as would be the case with the laser, the duty cycle is much shorter. If we assume a resolution of 1000×1000 (about as good as the best thermal imagers currently available), each pixel is illuminated only 1/1,000,000 of the frame period. (Actually, it is even worse than that, for I have ignored flyback, retrace and sync periods. The case is strong enough without them.) Therefore, the pixel will have to dissipate 1,000,000×.004=4000 W when it is active. This translates into an energy density of $$\frac{1}{(.001 \times .002)} \times 4000 = 2 \times 10^9 \text{ Watts/cm}$$

Such an energy density cannot be achieved through resistive heating. Only an electron-beam or perhaps a laser beam can produce these densities. Even if some way to attain the energy density resistively were to be found, it is unlikely that a semiconductor material could be found that would tolerate the peak temperature necessary to sustain the average temperature of 100° C. (And 100 C. is not excessive. It is at the low end of temperatures needed.)

Note also that the energy that would be dissipated in such a Cell would also be 4 KW, not "only a few hundred watts" estimated for a 100,000 pixel (316×316 pixel resolution, too coarse for even the better older generation FLIRs. Again, the common module FLIR has 180 detectors interlaced 2:1. Assuming square pixels, and a 4:3 aspect ratio, this translates to 480 horizontal pixels on 360 IR lines=172,800 pixels. In point of fact, the horizontal resolution of the common module FLIR is a function of its detector IFOV; of its amplifier bandwidth; and of its optical system. It is about twice that used for this calculation.)

If the higher resolution figure is used, and if the bias across the photodiode is 5 V, the current needed would be 4000/5=800 Amperes! Even with a 50 V bias it is 80 Amperes. Modisette describes the first conductive layer as a thin film of transparent gold. It is highly improbable that such a thin film could carry such a current without fusing. For example, according to MIL-STD-275B, a copper conductor of 600 square mils cross section will experience a temperature rise of 100 C. when carrying a current of 34 Amperes. A 3 oz. (.004" thick) conductor .150" wide has a cross section of about 600 square mils. If the temperature rise were to be held to 10 C., this conductor could carry only 10 Amperes. As gold is slightly more resistive than copper, (copper=1.7241 ohm-cm×10$^{-6}$ vs. gold=2.19 ohm-cm×10$^{-6}$, both at 20 C.), and their melting points are nearly the same, the current-carrying capacity of the gold film is even less than if it were copper. Even if the gold film did not melt, the temperature rise would produce intolerable artifacts when viewed with IR sensors which have a minimum resolvable temperature of less than 1/10 degree. It is also unlikely that the diode could withstand such a current, even for a brief period.

The emissive surface in the Modisette cell is gold. Polished gold has an emissivity of only 0.02 at 100 C., but it is relatively flat, and can be considered to be a graybody in the wavelengths of interest. If the diode reaches a physical temperature of 100 C., the radiometric temperature will be only 2 C. This is inadequate for most infrared systems testing. They will experience further losses through the "partially silvered mirror."

Thermal transducers—employing electron beams

In U.S. Pat. No. 4,542,299, Sep. 17, 1985, Scholz et al teach the application of a membrane within a cathode-ray-tube envelope which transduces electron bombardment into infrared radiation. The membrane is essentially the same as that used in the Bly Cell. By using an electron beam instead of an optical source, it solves the problem of extremely low conversion efficiency, and will permit the use of a video input to generate the images. It nevertheless suffers from many of the other problems of the Bly Cell, including very limited dynamic range, low maximum temperature, high minimum temperature, limited control over the time constant, and limited spatial resolution because of lateral thermal spreading.

In U.S. Pat. No. 4,687,967, Aug. 18, 1987, Rusche and Frosch teach a cathode ray tube with a target face consisting of a faceplate to which is mounted a regular array of islands which are scanned by a modulated electron beam. The energy of the impinging beam is converted to thermal energy. The result is an image corresponding to a video signal input. This patent describes a metal substrate with a regular array of electron-absorbing and infrared emitting islands. Some of the limitations of this approach are:

1. Such a regular array can sometimes cause an artifact usually called moire to appear in the image, degrading its quality. The manifestation of this artifact is the appearance of periodically spaced bright and dark bars in the image. This is actually a signal aliasing problem, caused by minor shifts in spatial frequency or phase. These cause wavefronts to add or cancel. The phenomenon occurs when the picture elements and the islands are not precisely aligned. A second degradation occurs when the spot of the impinging beam straddles more than one island. Instead of heating that island exclusively, the energy is divided. A similar problem has long been known in television systems, where a picture feature may be the width of a scan line, but is positioned so that its center is on the boundary between two raster lines. This is called the Kell effect. Empirically, it has been found that a 0.70 Kell factor applied to the number of active lines will predict the resulting degradation of resolution. In the present application the problem is two-dimensional, i.e., the beam might be centered on the intersection of four islands. This, and the spacing between islands will degrade the resolution to about 0.49 of that which would be estimated by only counting the number of islands.

2. Rusche et al further teach that the islands or mesas which form the reticulated target are attached to the faceplate. While this is feasible, for some applications, it is preferable to mount the target on a structure either within the vacuum envelope or on an interface surface between the vacuum envelope and the surrounding atmosphere. In such a system there is usually no faceplate. The closest analog to a faceplate would be the viewing port, and it is never desirable to mount the target in thermal contact with this. First, the thermal coefficient of expansion can cause destructive stresses in the window. Second, the index of refraction of the window materials is affected by their temperatures; local changes in temperature will result in a localized pattern of indices in the window. This, in turn, will induce image artifacts. Third, increased temperatures diminish the transmission of IR-transmissive materials. For example, at a wavelength of 8 micrometres, transmission of an uncoated 1.5 mm thick window made of germanium, a commonly used material for IR windows, drops from approximately 40% at 25 C. to nil at 300 C. Finally, in the configuration of the systems described by both Rusche et al and in the instant patent, the irradiated and the radiative surfaces are on the same side of the target substrate, which is a major factor in their improved performance. This would not be feasible were the target to be mounted on the window-faceplate.

3. Just as it is not necessary to have a faceplate, it is possible, and frequently preferred, to dispense with the neck or the cone sections of the tube envelope, unlike the teaching of Rusche et al. In such a device, all of the components, including the electron lens system and the deflection system are located entirely within the vacuum tube. Such a configuration would be found most often in a "demountable tube", one which is built especially for applications in which the internal components are changed frequently. It allows the internal volume to be returned to atmospheric pressure, the envelope to be opened, changes to be made, evacuated, and operated again.

4. Rusche et al teach the use of an electron beam as the source of energy to be converted to thermal. Any form of energy capable of being modulated, formed into a beam of the required dimensions, and of being directed accurately to the desired locations can be used. A good example of an alternate source is a laser beam.

5. The patent shows the electron beam directed so that its central ray is perpendicular to the target, while the infrared device under test views the target through a window at a slight angle. This presents two problems:

a. In a system with a reticulated target, by definition there are spaces between the target elements. When the energy beam is directed normal to the target face, if the beam does not fall entirely within a given element area, or if the beam is continuously scanned, some of the energy will strike and be dissipated in the substrate. This not only wastes power, but because the substrate is not the infinite heat sink that would be ideal, heat generated on the substrate can be transferred to adjacent pixels which can lead to cross-coupling of the energy, resulting in reduced resolution. In addition, any damaged, missing, or mislocated element will appear as an image artifact, usually as a pixel with diminished or no response.

b. If an image is projected on or from a tilted focal plane, the image will be distorted. If the image is rectangular and one edge is perpendicular to the center of the beam, the image will exhibit a trapezoidal shape usually referred to as keystoning. In addition, with a fixed focus lens, only a part of the image will be in perfect focus. The depth of focus of the system will determine the magnitude of this latter problem.

6. Rusche et al describe a metal substrate. The substrate can be of any material, provided that it is electrically and thermally conductive. In some cases, non-metallic materials may be preferred.

7. Finally, while it is useful in many applications to have the target contained within the vacuum envelope, because it eliminates convection currents which provides improved thermal uniformity, because it eliminates high temperature oxidation damage to the target, and because it simplifies the construction if an electron beam is used as the energy source, it is not necessary to the operation of the simulator. A laser operating in the atmosphere obviously can be used in the manner described. Use of an electron beam may be harder to understand, but in electron beam welding applications, there are systems which allow the beam to be projected outside the vacuum to a workpiece in the atmosphere. Such a system would be more difficult to build than one with the target in the vacuum, but if the application requires it, it is feasible.

In U.S. Pat. No. 4,572,958, Feb. 25, 1986, Durand et al describe a system which employs a matrix of reticulated elements on an infrared-transparent substrate. They use a pixel element comprising a bifurcated opaque radiating layer, and a transparent thermally insulating layer, on a transparent thermally conductive layer, mounted on a second transparent thermal insulator. (Although we will use Durand's terminology, it should be apparent to one familiar with the art that in fact what is needed is not a true insulator, but a material with low, but finite conductivity.) Each of these is separated from the adjacent pixel elements on a second transparent thermal conductor which is the size of the focal planes. The transparency referred to above is in the wavelengths of interest. The pixel elements are scanned by an electron beam which impinges only on the first thermal conductor at the bottom of the groove formed by bifurcating the first thermal insulators and the opaque radiating layers, without striking them. Some of the limitations of this approach are:

1. Because the beam diameter must be smaller than the pixel dimensions, the resolution for a given size target and a given beam diameter is reduced over that achievable with a system that is beam-diameter-limited.

2. Spaces between the elements forming the pixels will limit the attainable fill factor.

3. The requirement that the thermally conductive and insulating layers be simultaneously transparent in the infrared wavelengths of interest severely constrains the choice of materials. The material selected for the second conductor (faceplate) must in addition be sufficiently impermeable and strong as to be used as a vacuum port window. One result of this is that the available materials cannot sustain very high temperatures without damage. This limits the available delta temperature.

4. The requirement that the image be viewed through the substrate precludes the application of an opaque heat exchanger device over its area, so the substrate can be cooled only through radiation or lateral convection to the edges. Any radiation will be seen by the device under test, and, while it may be diffused, it will, at a minimum, contribute a veiling glare. This further limits the apparent delta temperature and reduces the resolution of the system. Cryogenic background temperatures cannot be achieved with such a system. As such devices are typically used to evaluate systems capable of sensing very small temperature differences, it is difficult to believe that sufficient uniformity could be achieved, given the above limitations.

5. As the photons from the emitting surface pass through the alternating layers of conductors and insulators, a certain amount of energy is reflected at their boundaries, determined by their differences in indices of refraction. This is well known in the art. Durand makes an oblique reference to it by suggesting that a dielectric interference antireflection coating be applied to the interface between the second conductor and the air. The internal reflections cause blurring of the image, as well as loss of efficiency.

6. Increases in the temperature of the transparent materials will change both their indices of refraction and also their transmission (transparency). This will cause artifacts in the image.

7. Because of the requirement to scan only the bottom of the groove of the pixel cells, an extremely precise deflection system must be employed. This will add substantially to the system complexity, particularly if high scan rates are attempted.

Light valve systems

The third approach, the light valve, employs a fixed radiation source and selectively attenuates it pixel-by-pixel to form an image. This can be thought as an array of controllable variable neutral-density filters. There are several approaches to this. The oldest uses film of oil or gel which is deformed by the action of an electron beam. This produces a rugate surface which is used to vary the angle of refraction or reflection of the energy source. The radiation is then either partially blocked or passed through a grating formed with a Schlieren optics system. This results in the light intensity modulation observed in the image. In the visible light spectrum, these are described in U.S. Pat. No. 2,391,450, by F. E. Fischer.

Another embodiment used for the production of infrared images replaces the deformable film and Schlieren optics with a liquid crystal light valve. One such system is described in U.S. Pat. No. 4,723,077, Feb. 2, 1988 by Wu.

Still another variant uses a solid-state effect to bend a reflective surface changing the angle of reflection, with the light rays selectively partially blocked as described above. Some of these are disclosed in U.S. Pat. Nos. 4,403,248, Sep. 6, 1983 by Te Velde, 4,626,920, Dec. 2, 1986, by Glenn, 4,680,579, Jul. 14, 1987, by Ott, and 4,710,732, Dec. 1, 1987 by Hornbeck.

Some of the disadvantages of these systems are:

1. Because the grating blocks at least half of the energy available, the deformable film and the solid-state systems suffer from an inability to produce high temperatures. This is compounded by a sensitivity of the reflecting/refracting deflecting media to thermal effects. These occur because the reflection or transmission is always less than 100%, and the losses result in heating the deflection media.
2. It is not possible to produce images which reproduce cryogenic backgrounds for reasons similar to the proceding.
3. Because they attenuate an energy source of a fixed intensity, the individual pixels do not have the spectral content that would be associated with their simulated temperatures. That is, the imagery cannot have the desirable graybody or near blackbody response.
4. Systems which use oil, gel, or similar deformable media must be periodically disassembled, and the media must be changed because it is decomposed by the electron beam. This is a process which is time consuming, and takes skill. It should also be noted that no matter what the threshold of performance is set for initiating these overhauls, between refurbishments, the system is continually experiencing degradation. This could introduce anomalies in tests, particularly ones long in duration.
5. Systems which use mechanically moved mirror elements are subject to wear and fatigue, and experience failures of the flexing elements. In addition, it will be difficult to operate these in a closed loop, so the mechanical components must be very precisely matched to obtain uniform response from pixel to pixel. Given the small dimensions of the pixel, even tiny physical errors will result in large tolerances.

Direct writing on the detector

The fourth approach uses a laser beam to write the image directly on the detector array. This has several disadvantages:

1. If the system under test employs a scanned detector (as opposed to a staring detector), there is little temporal integration of the incoming radiation. Therefore, it is not possible to write an entire scene on the detector unless the position of the detectors is known very precisely. Given the problems introduced by aberrations in the optical system and in the scanning system, thermal effects, vibration, and other error sources, it is difficult to maintain such alignment.

The U.S. Military tri-service common module FLIR, for example, scans the image bi-directionally across a vertical column of detectors. To generate an image in such a system, the laser would have to track the scanner horizontally, while moving its beam diagonally to scan each of the continuously-moving detectors in the column.

If the laser is used with a staring system, it must be scanned across the array. If the scan mechanism fails, the instantaneous energy applied in a single location may damage the detector under test as the continuous power needed is determined by the duty cycle. In the case of a 1000×1000 element detector, this would be greater than 1,000,000:1, accounting for scan inefficiencies.

2. In addition, the laser is naturally a monochromatic source. It produces a line spectrum. Like the light valve systems, this precludes a graybody response.

In addition, the narrow spectral output may not fall within the response curve of some detectors.

Phosphors

Finally, there has been speculation that there may be materials which will act as phosphors in the infrared portion of the spectrum. Those that have been identified are in the near-infrared region, and not in the medium to long wave thermal infrared spectrum which is needed. U.S. patents for these materials include: U.S. Pat. Nos. 4,350,604, Sep. 21, 1982, by Awazu et al with peaks at 725 to 775 Nm and response to 900 Nm; 4,499,005, Feb. 12, 1985, by McColl et al, with a peak at 800 Nm; 4,652,793, Mar. 24, 1987, by van Koesveld (peak at 825 Nm, response to about 1000 Nm) and 4,719,387, Jan. 12, 1988, by Catherall and 4,806,825, Feb. 21, 1989 by Catherall et al (longest wavelength peak at 700 Nm).

In U.S. Pat. No. 5,012,112, Flint et al describe a cathode ray tube with a phosphor which emits infrared for use in an infrared scene generator. This would operate like a common CRT, in that it has a phosphor, which when excited by an electron beam, emits photons. While a large number of materials are listed as potential candidate phosphors, Flint et al report success with only one unidentified phosphor at 3 $\mu$meters, with 100 lines per inch resolution and 100 frames per second. Nothing was stated regarding equivalent radiometric temperature. 3 $\mu$meters is at the low end of the mid-infrared window in the atmosphere. Some IR detectors do not have significant response in this part of the spectrum. Even if other phosphors do exist with significant output in the longer wave spectra, they, too would suffer from the limitation of not producing the graybody response as described above. Further, Flint et al teach that to improve efficiency of emission the phosphor must be cooled. This not only limits the capability of producing warm backgrounds where needed, it also suggests that the output may be highly non-linear and possibly dependent on the recent intensity history of the pixel being addressed.

OBJECTS AND ADVANTAGES

Figure 1:
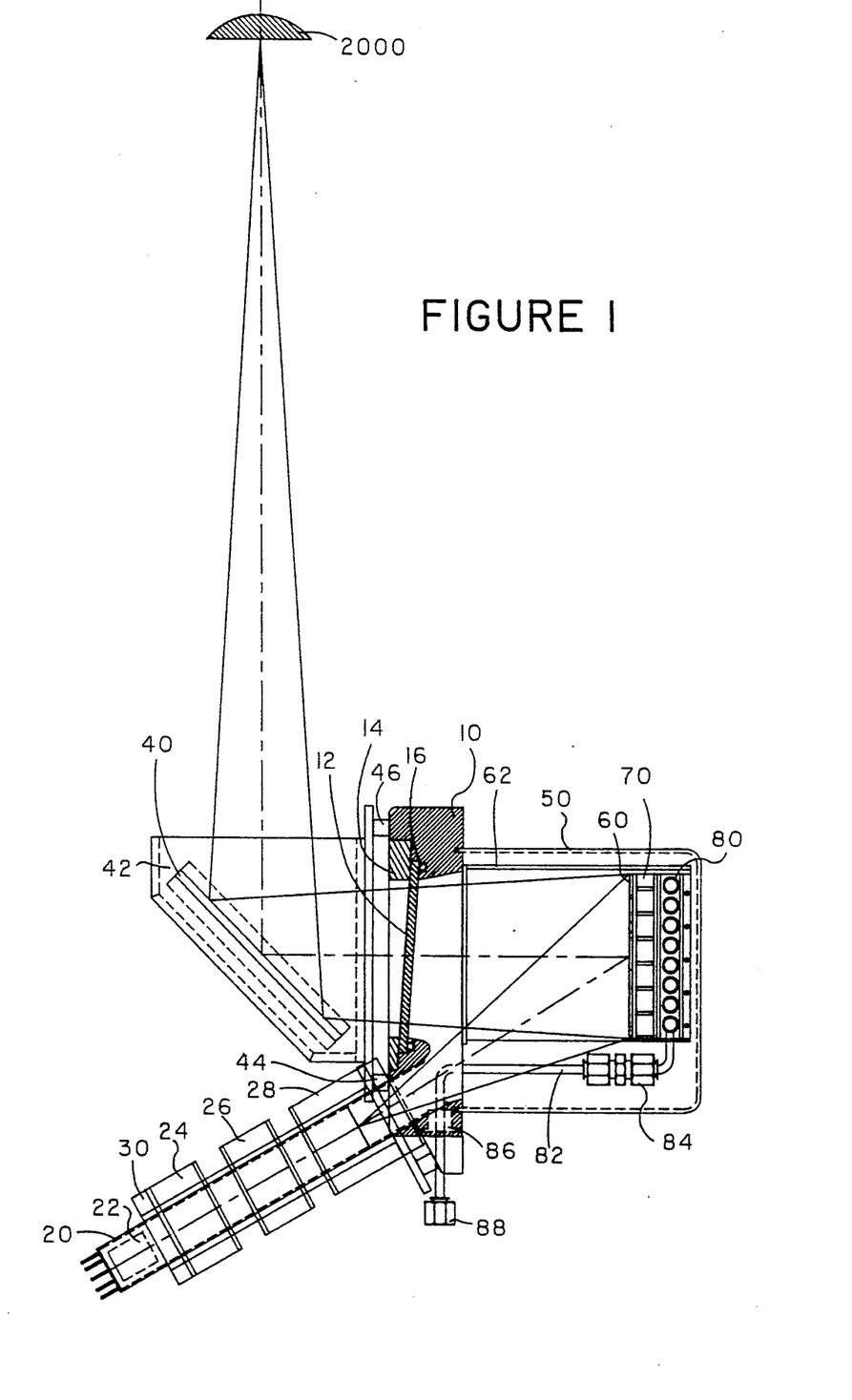
FIG. 1 shows the overall electrical signal to thermal image converter.

Accordingly, several objects and advantages of the present invention are:

1. The upper temperature attainable on the target is limited only by the destruction temperature of the target material. Carbon, a preferred material, melts at 3450° C. This is high enough for all known applications.
2. The achievable low temperature is limited only by the efficiency of the thermal transfer system used to cool the target. Cryogenic background temperatures can be realized with this invention.
3. Referring to FIG. 1, an elaborate scheme for addressing individual pixels is not required because a target 60 is heated by the action of the electron beam, which is addressed by a deflection yoke 28. Standard deflection techniques used in television, video, and x-y displays can be used. These are less complex than two-dimensional matrices particularly when large numbers of elements (pixels) must be addressed.
4. Using a single beam to heat all of the pixels results in improved uniformity of response.
5. Essentially one hundred percent fill factors can easily be achieved because the spot has an approximately Gaussian power distribution. By controlling the beam position so that the overlap at the edges results in a uniform energy distribution, an image with no dead areas can be obtained.
6. The input is an electrical video signal. No clumsy intermediate conversion to an image composed of other wavelengths of light, with its attendant losses, is needed.
7. The design of the target, with its reticulated elements mounted on a heat sink, minimizes thermal spreading caused by either conductive or radiative transfer. The target substrate is thermally connected to heat-regulating device. This permits us to control the temperature of the background more precisely, to change the temperature more quickly, to reduce the temperature variations spatially across the target, to reduce the temperature variations temporally, to achieve either elevated temperatures or reduced temperatures, and to provide cryogenic temperatures.
8. Great latitude is available to the designer to trade off the various characteristics, such as input power, time constant, temperatures, etc.
9. Moiré patterns and similar artifacts are eliminated by placing the elements comprising the target in a random pattern. The invention uses a reticulated target composed of a multiplicity of energy-absorbing and infrared-emitting elements, randomly placed on a substrate. This reduces the artifacts that often result from aliasing effects when regular patterns are imaged on a substrate having a regular structure.
10. Mounting the target on an internal structure rather than on the faceplate allows greater flexibility in the design of the simulator. In particular, it greatly reduces problems related to controlling the temperature of the substrate, and utilizes the vacuum to prevent convective losses.
11. Elimination of unneeded constraints on the support structure and form factor of the vacuum envelope affords the designer the opportunity to produce a far more efficient design for specific applications. The vacuum vessel (if used) can be of many configurations. In some cases a tube resembling a conventional cathode-ray-tube may be preferred, in others, an envelope like a bell-jar might be desired, or still other shapes may be required. All can be accommodated by this invention.
12. Use of alternate energy sources to effect the localized thermal variation of the target substrate allows the designer to tailor the system more closely to the application, and to increase the range of usable target materials. The energy source consists of an electron beam, laser or other means of directed energy.
13. Use of a beam with rays other than perpendicular to the target face or of a target with an overlapping structure, or both, eliminates losses of energy to the faceplate and improves uniformity. When the target has a multiplicity of elements representing each pixel location, loss or damage of one, or even several, results in only a minimal change in that pixel's response.
14. Causing the electron beam to impinge on the target rather than having the infrared device under test view a tilted focal plane allows the designer to provide electronic correction of keystoning and dynamic focus. This is far easier than making equivalent corrections optically. The scanning beam impinges on the target at a slight angle. This improves the efficiency, because any rays which fail to irradiate one element will fall on an adjacent element, rather than on the substrate. This also increases the uniformity of the image, because if there are missing or displaced thermal elements, again, the beam will irradiate the adjacent element. Finally, because the energy beam path and the optical path of the device under test may conflict, introducing the energy beam at an angle will allow the central ray to the device under test to be normal to the target surface. Thus, the device under test will not see keystoning distortions, nor will the focal plane be tilted, with its attendant focusing problems.

The elements of the target can also be placed at an angle, be bent, or be shaped to prevent the beam from striking the substrate if it is preferred to have the rays from the energy source impinge on the target at an angle normal to the surface. Such a target can also be used in conjunction with the angled beam described above to enhance the effect still more.
15. Use of non-metallic as well as metallic substrates provides latitude in design for specific applications.
16. Elimination of the constraint to operate only in a vacuum allows consideration of alternative optical designs. Targets can be located either inside or out of vacuum. While the electron beam heating a target in a vacuum is the presently preferred embodiment, there may be factors which dictate other sources of directed energy, or the use of an out-of-vacuum electron beam.
17. Size of, and positional control of the electron beam need only have the precision needed to maintain the needed resolution on the target. This reduces system costs.
18. Virtually any material can be used as a target facing. This will allow implementation of specific solutions in some cases, which would not be possible if more constraints were to be applied, and permits the use of materials with excellent blackbody characteristics, physical characteristics, and temperature ranges without regard to infrared transparency.
19. Thermal emission occurs from the surface of the target which faces into the energy beam. It does not pass through the substrate. This eliminates the artifacts, losses, and degraded resolution that would otherwise result.
20. Thermal emission occurs from the surface opposite the heat sink, so the target can be controlled and the desired delta temperature can be maintained.
21. Multiple interfaces with materials with differing indices of refraction are not needed, eliminating the losses and variations that would result from that, and from temperature-induced shifts in the indices.
22. No grating, which will block substantial portions of the energy, is required. This allows higher delta temperatures.
23. Temperatures generated by the system correspond to the expected blackbody response, and are not shifted by attenuation effects.
24. The target material is very stable, and can be expected to have indefinite life.
25. No mechanical flexure or positioning is involved on the target. This improves its reliability.

26. The target forms an image which can be viewed by the device under test, like a natural scene. This reduces problems of validation. No beam projected into the device under test is needed with its attendant alignment and personnel safety problems. There is little likelihood of damaging the device under test, even in the event of failure of scan. Although the temperatures that are theoretically achievable are quite high, in practice they would be controlled to lower values. The target presents an area source which will be imaged, and has its own persistence, unlike laser simulators which direct their high energy beams directly at the focal plane of the device under test.

27. The target is viewed on same side as the irradiation by the energy source. This simplifies the construction, allows a far wider selection of materials and allows much greater reduction of thermal spreading compared to devices employing membranes or transparent substrates. The elimination of this constraint allows us to use a heat sink on the substrate of any material, and of nearly any reasonable size, and further to cool or heat this substrate actively with a liquid, gas, thermoelectric, electrical resistance or other refrigeration system, heating system, or heat exchanger. This minimizes the cross-coupling of thermal energy from element to element.

28. A multiplicity of small thermal elements instead of a single larger element per pixel confers several advantages: they can be packed more densely, reducing the dead space between them. By having many (in the preferred embodiment, tens, or even hundreds of elements per pixel) elements, the effects of degradation or loss of one are reduced. Further, no special electron beam registration techniques are needed as would be the case with a single thermal element per pixel design.

The invention produces high resolution, high delta T, images from a variety of electrical inputs. These include, but are not limited to:
1. Standard composite video rastered video
2. Non-composite rastered video with separate sync and blanking
3. Non-standard rasters
4. X-Y inputs
5. Lissajou or other stroke-writing inputs, and
6. Digital video.

Some examples of sources of these inputs are:
1. Video output infrared imaging systems
2. Computer-generated imagery systems
3. Video cameras
4. Video recorders, and
5. Special purpose pattern generators.

The system operates in real time, and the thermal time constant can be controlled to accommodate varying frame rates, and to trade off between motion-induced blurring and flicker, just as persistence is controlled in phosphor-based cathode ray tubes operating in the visible spectrum.

Unlike light valves, the instant invention generates a thermal image on a substrate. It does not modulate an external source. Therefore, it is capable of producing higher temperatures, of creating higher thermal contrast images, of producing images with lower background temperatures than are systems employing alternative technologies.

REFERENCE NUMERALS IN DRAWINGS 10 header/optical bench
12 IR window
14 clamping ring
16 seal
20 electron gun neck
22 electron gun assembly
24 primary electron lens
26 secondary electron lens
28 deflection yoke
30 coil support
40 first surface mirror
42 mirror support
44 forward bosses
46 rear bosses
50 vacuum chamber
60 target
62 target assembly support
602 substrate
604 thermal elements
606 adhesive
614 missing thermal element
70 thermoelectric cooler-buffer
80 heat exchanger
82 heat-exchange medium line
84 union
86 cryogenic feedthrough
88 external union
90 laser beam source
91 modulator
92 line scanner
93 line scanner drive motor
94 field scanner
95 field scanner drive motor
96 laser beam
97 vacuum vessel
98 IR window for device under test
99 IR window for laser beam
1000 bundle of rays formed into a beam

DESCRIPTION

FIGS. 1 to 8

The invention consists of a target which is irradiated by a source of energy such as a laser beam or an electron beam. It converts this to thermal energy, part of which is radiated. The other part is conducted to, and dissipated in the substrate. This coupling to the substrate minimizes thermal spreading and allows control of the time constant of the images. This is the thermal equivalent of persistence in a cathode-ray-tube phosphor. The substrate can be conductively or radiatively cooled or heated to maintain a desired background temperature.

The pattern so produced on the target is viewed by a thermal imaging device under test which views the side of the target being irradiated by the energy source. This allows the use of either infrared-opaque or -transparent materials as the target absorber/radiator elements.

The target is reticulated to reduce thermal spreading through lateral conduction. By making the target of materials having relatively high thermal resistance and the substrate of a material having a low thermal resistance, the flow of heat is primarily from an element to the substrate where it is dissipated.

In the preferred embodiment, the video to thermal converter is housed in a vacuum enclosure. Referring to FIG. 1, a header/optical bench 10 is used to mount all of the major components. This ensures mechanical stability of the optical and electronic subassemblies. An IR-transparent optical window 12 is mounted in the header/optical bench. This can be made of zinc selenide, germanium, or other materials suitable for use at the wavelengths of interest. If a relatively narrow range of wavelengths is all that is of interest, this window should have an anti-reflection coating applied to minimize losses. Operation over a wide spectrum may make this prohibitively expensive, but coating for selected wavelengths may be feasible. The window is held by a clamping ring 14, and is sealed by a seal 16. The seal can be an indium O-ring, or any other suitable means. Note that the window is tilted with respect to a line perpendicular to the central ray from target 60. This is done to minimize narcissus.

A tubular electron gun neck 20 penetrates header/optical bench 10 and protrudes from it. At the end, an electron gun assembly 22 is mounted internally. Primary electron lens 24 and secondary electron lens 26 are mounted on the tube, as is a deflection yoke 28. Note that while magnetic deflection and focus units are shown, electrostatic means can also be used for either or both functions. In addition, combinations of the two means can be used for a single function (i.e., both magnetic and electrostatic deflection can be used in a single system.)

A coil support 30 holds the lenses and deflection system in alignment. It is mounted to header optical bench 10.

A first surface mirror 40 is held at a 45 degree angle (referenced to a line normal to the surface of target 60) by a mirror support 42. Mirror support 42 is attached to header/optical bench 10 by screws in bosses 44 and 46.

A vacuum chamber 50 completes the vacuum envelope.

Inside the envelope, target 60 is held by a target assembly support 62 which in turn is mounted to header/optical bench 10. Mounting all of the critical components to the rigid optical bench ensures precise alignment. It is essential that target assembly support 62 be as rigid as possible to maintain this alignment.

A thermoelectric cooler-buffer 70 is mounted below and in contact with the lower surface of target 60. The other working surface of thermoelectric cooler-buffer is mounted in contact with the upper surface of heat exchanger 80. Both thermoelectric cooler-buffer 70 and heat exchanger 80 are mounted on target assembly support 62. If a heat-conducting compound is used to obtain improved thermal contact between the mating surfaces of thermoelectric cooler-buffer 70 and heat exchanger 80, its outgassing characteristics must be considered. Low vapor pressure materials should be selected for this application, even at a sacrifice of a small amount of thermal efficiency. Silicone greases intended for high vacuum systems such as Dow Corning DC 976 or DC 340 are suitable. Surfaces should provide as smooth a mating surface as possible, to minimize the volume of such compounds, while reducing thermal resistance. In other embodiments, the thermo-electric cooler-buffer can be replaced with a heating element, such as a printed-wiring electrical resistance heater.

A heat-exchange medium line 82 carries the fluid or gas used to maintain the temperature of the heat exchanger. A union 84 is shown in this line to facilitate service, should it be desired to refurbish the converter. It is not necessary, and a brazed or soldered joint can be used instead. If used, union 84 should be rated for high vacuum service. Cajon Ultra-Torr Fittings would be an example of suitable fittings. Heat-exchange medium line 82 penetrates header/optical bench 10 through a cryogenic feed through 86. Connection to an external heat-exchange fluid system is made with external union 88.

Figure 2:
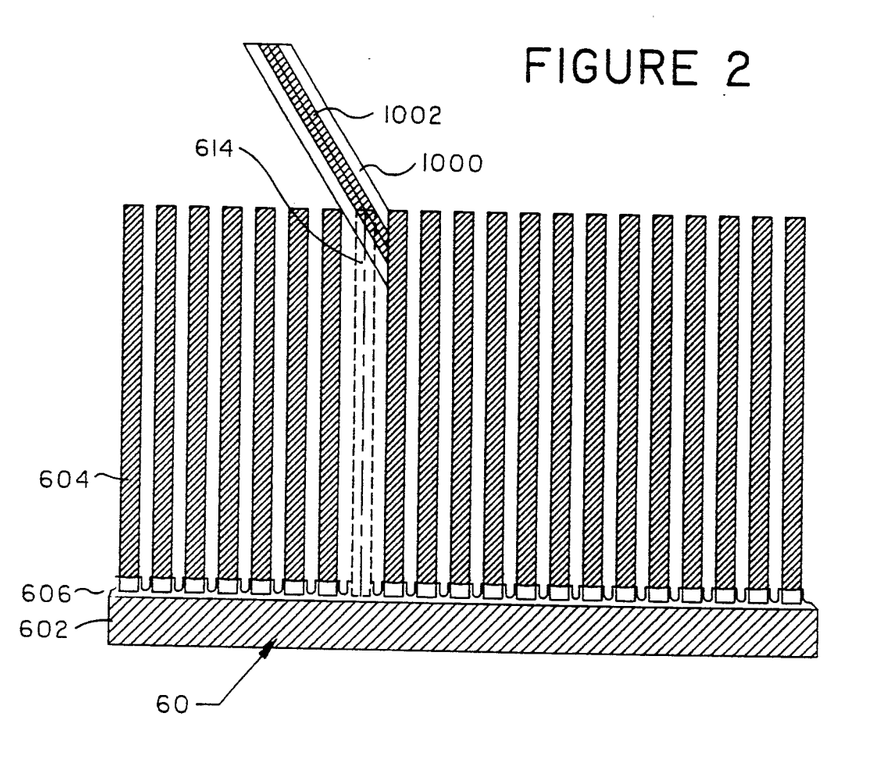
FIG. 2 shows a side view of the target with virgate elements perpendicular to the substrate, depicting the effect of a missing or displaced element when irradiated by a beam impinging at an angle off normal to the substrate.

Referring to FIG. 2, target 60 is comprised of a substrate 602, a multiplicity of thermal elements 604 and an adhesive 606 for affixing the thermal elements 604 to substrate 602. The substrate must be both electrically and thermally conductive. Copper is a satisfactory material for this. The elements must be at least as small as a pixel, and preferably much smaller. They are arranged fortuitously to minimize aliasing which occurs when regular patterns are superimposed. The requirements for the elements are that they do not outgas or degrade in a vacuum, that they be mechanically strong, that they withstand the maximum and minimum temperatures expected, that they have reasonably high emission in the spectral region of interest, that they have a high specific heat, that they have low thermal conductivity, and that they can be bonded to the substrate. Amorphous carbon has the most favorable combination of these characteristics, and should be used for the target. The target can be made from $0.28 \times 10^{-3}$ inch diameter XA-S carbon fibers manufactured by Hysol Grafil Co. of Pittsburg, Calif. The fibers are cut into short lengths and are formed into a wafer of parallel elements. The ends of the elements are bonded to the substrate with an adhesive 606, which is an electrically and thermally conductive epoxy such as Master Bond EP77M-1HP. Care must be taken to minimize "wicking" of any adhesive used as this will decrease the thermal time constant of the affected elements. The elements must be trimmed to a uniform length.

Substrate 602 serves as a heat sink for the thermal energy conducted down the element and as a thermal spreader for thermoelectric cooler-buffer 70 of FIG. 1 mounted below it. For both of these functions it is desirable that it have as much mass as possible. The tradeoff is that larger mass increases the time to change the temperature of the substrate, resulting in delays before target 60 reaches a stable temperature when first turned on or after a change is made. The mating surfaces of substrate 602 and of thermoelectric cooler-buffer 70 should be as smooth as possible for the reasons given above.

The thermal spreader function is needed because large area thermoelectric heat pumps such as used for thermoelectric cooler-buffer 70 are composed of numerous couples tesselated to form a larger panel. While they normally have an integral plate for coupling to the external source and sinks, this may not be adequate to reduce spatial temperature variations to that required. The result, if uncorrected, would be an undesirable spatial thermal "ripple" across the target surface.

Target 60 has a multiplicity of thermal elements 604 forming a pixel. A missing thermal element is denoted by 614. A bundle of rays formed into a beam 1000 impinges on target 60. Note that the rays which would have hit missing element 614 instead strike the adjacent element(s). Thus, no energy is lost, as would be the case if the ray bundle were disposed to an angle normal to the substrate. In that case, the rays would be absorbed by the heat sink, and would contribute little heat to the intended pixel. Disposing the beam at an angle therefore increases the uniformity of response.

In addition, it can be seen that no matter how efficiently the elements 604 are packed, there will remain space between them. If a beam of energy were to be directed straight down on them a portion of the energy would fall on substrate 602. This would not only dissipate energy without heating the desired elements, because the heat sink is not infinite, some lateral spreading will inevitably occur. Directing the beam of energy at an angle also prevents this.

Figure 3:
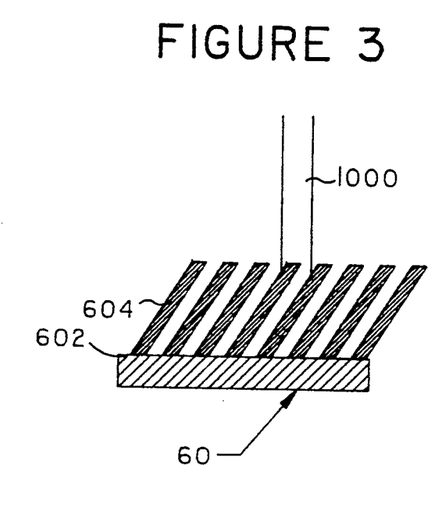
FIG. 3 shows a side view of the target with virgate elements mounted at an angle to the substrate, with a beam normal to the substrate irradiating them.
Figure 4:
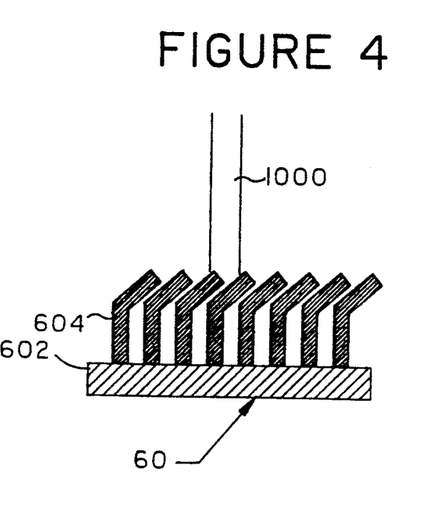
FIGS. 4 and 5 show two variations of imbricated elements.
Figure 5:
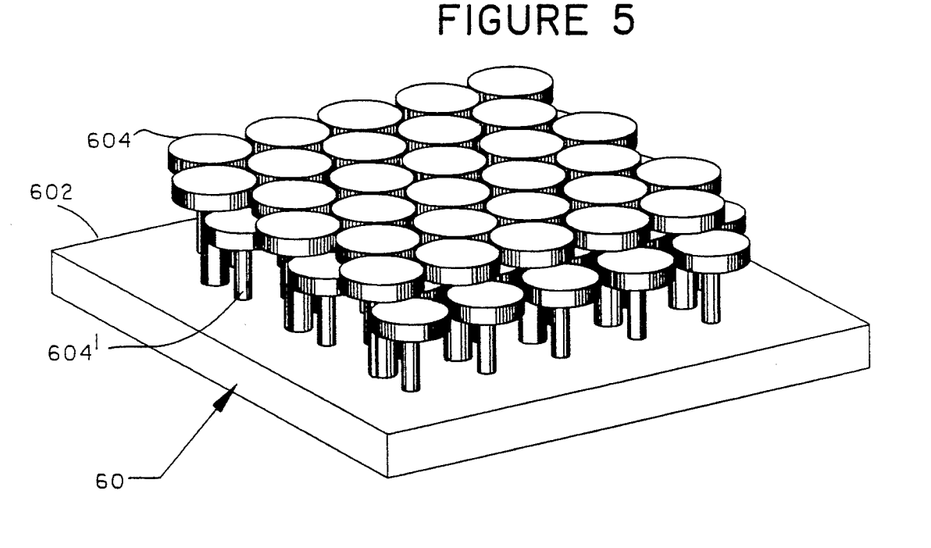

If, for some reason, it was preferred that the beam be normal to the target face, a similar advantage could be gained by canting the target elements, as shown in FIG. 3, by bending them as in FIG. 4, or by shaping them as in FIG. 5. Any number of shapes other than those shown are possible as long as they result in an imbrication wherein the substrate is always shielded from any ray, even if an element is missing.

Figure 6:
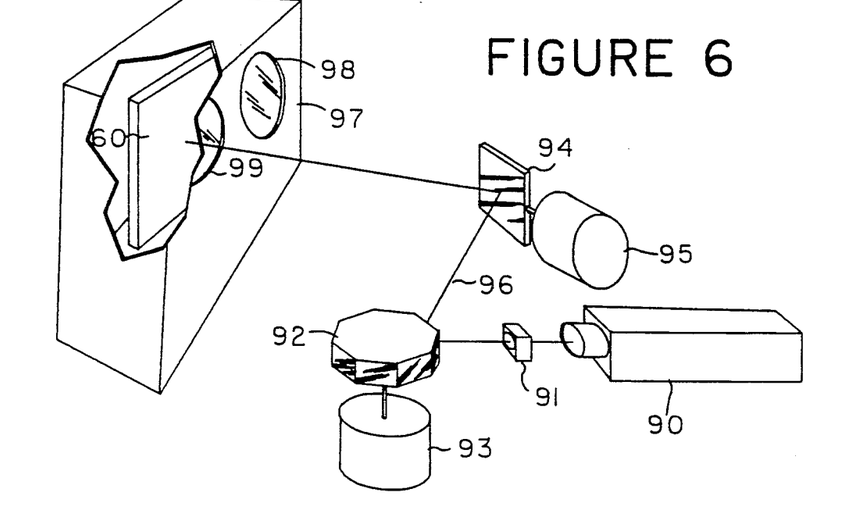
FIG. 6 shows the laser beam source external to a vacuum vessel which has the target within.

In some alternate embodiments, a laser 90 is used to provide the energy beam 96. Referring to FIG. 6, the output of the laser is projected into a modulator 91. Thence, it is deflected in the X- and Y- axes by line scanner 92 and by field scanner 94. These are driven by line scanner motor 93 and by field scanner motor 95. The beam passes into vacuum vessel 97 through the IR window for laser beam 99, then intercepts target 60, which was described under the preferred embodiment. The resulting image is viewed through the IR window for the device under test 98.

Figure 7:
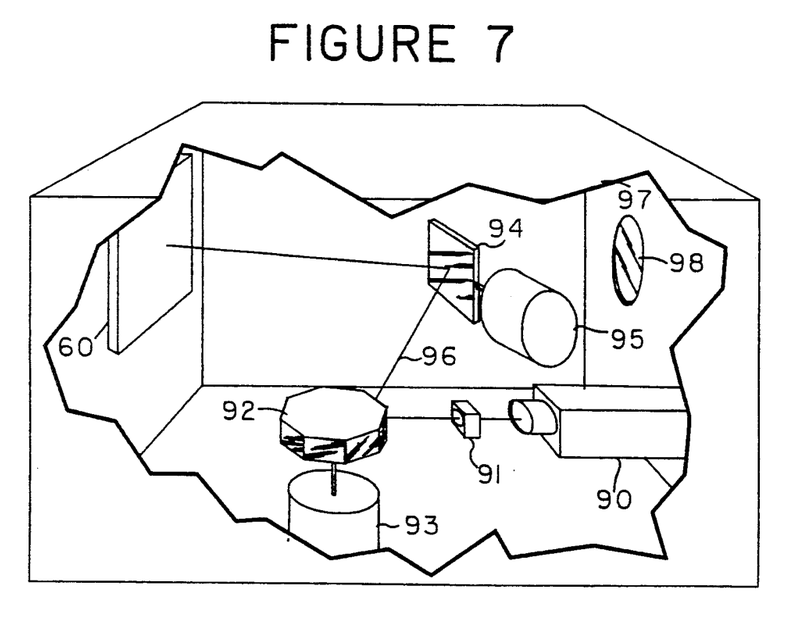
FIG. 7 shows both the laser beam source and the target within a vacuum vessel.

Referring to FIG. 7, the description of the components is the same, except that the vacuum vessel 97 now contains all of the components, and the IR window for the laser beam 99 is not used.

Figure 8:
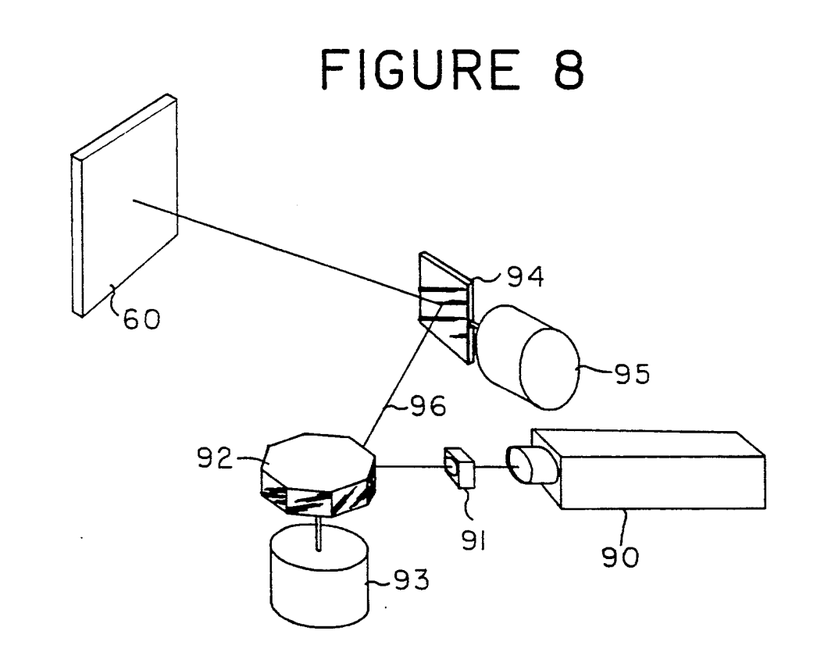
FIG. 8 shows both the laser beam source and the target at normal atmospheric pressure.

Referring to FIG. 8, the description of the components is the same, except that the entire system operates in the atmosphere, so the vacuum vessel 97, the IR window for device under test 98, and the IR window for laser beam 99 are not used.

Pp. 39, line 4, change "FIGS. 1 and 2" to "FIGS. 1, 2, and 6 to 8". On lines 20 and 21, change "The energy content of an electron beam can be calculated by simply multiplying the voltage and the current of the beam 1000." to "(The energy content of an electron beam can be calculated by simply multiplying the voltage and the current of the beam 1000.)"

Pp. 40, line 24, insert: "An alternate embodiment is shown in FIGS. 6, 7, and 8. All three are the same with the exception of the positioning relative to the vacuum vessel. Here, the energy source is a laser 90. The wavelength of the laser should be out-of-band for the device under test to preclude artifacts. Its beam 96 is modulated in accordance with the level of the video input by modulator 91. The beam is deflected in the direction of the fast scan (at the line rate) by line scanner 92, driven by line scanner motor 93. Although the line scanner is shown here as a rotating, multifaceted mirror, in other embodiments it could be replaced by other means such as an acousto-optic modulator or a planar mirror. The beam is then deflected in the slow scan direction (at the field/frame rate) by the nodding planar mirror 94 driven by the torque motor 95. Again, other means to deflect the beam can be used, and other means to drive a planar mirror are also feasible, such as a galvanometer drive or a mechanical drive. The configuration of the scanners shown in the drawings will produce a raster in the conventional orientation; the fast scan is horizontal, the slow, vertical. This can be rotated 90° if desired, and the scans can be unidirectional or bidirectional as required. Interlace can be provided by offsetting the slow scan deflection angle between alternate fields.

The deflected, modulated beam strikes the face of the target 60, and the remainder of the operation is as described under the preferred embodiment, above.

FIG. 6 illustrates the target within a vacuum vessel 97. The beam enters the vessel through the IR window for laser beam 99, whereupon it impinges on the target as above. The device under test views the target through the IR window for device under test 98. In some embodiments, a single window may take the place of the two illustrated.

FIG. 7 shows both the target and the laser system within a vacuum vessel 97. The function is as described above, except that only the IR window for device under test 98 is used.

FIG. 8 shows all components of the system in the atmosphere. The operation is as described in the beginning paragraph.

OPERATION

FIGS. 1 and 2

In operation, the electrical signal to thermal image converter is connected to the appropriate electronic drive and deflection circuits. These are well known to practitioners of the art. Please refer to FIG. 1. Signals are applied to these circuits, and they in turn drive electron gun assembly 22 and deflection yoke 28. Electron gun 22 produces a beam of electrons which are accelerated by the difference in electrical potential between it and the target. The beam is focused on target 60 by electron lenses 24 and 26, and is deflected horizontally and vertically by deflection yoke 28. Beam 1000 shown in FIG. 3 may be amplitude modulated as are most conventional cathode ray tubes, or it may be time modulated, or the rate of the sweep may be varied to vary the dwell on a given pixel. Any of these will produce a pattern of varying thermal intensity on the target.

This kinetic energy pattern is then converted to heat as the electron loses velocity. The energy content of an electron beam can be calculated by simply multiplying the voltage and the current of beam 1000. In this way, the pattern described by the beam is converted into a thermal pattern. The elements have thermal mass, and thermal losses through conduction and radiation (also convection if operated out of a vacuum). Therefore, they have a thermal time constant which is analogous to the persistence in a conventional cathode ray tube. Please refer to FIG. 2. By selecting the materials and the geometries of elements 604, the designer has considerable flexibility in setting this time constant for differing applications.

After the pattern is written, it decays through radiation and especially conduction to substrate 602. To minimize cross-coupling which causes blurring, the conductive losses should be far higher than the radiative losses. Also, substrate 602 should resemble an infinite heat sink as closely as possible. To this end, substrate 602 is made of a highly conductive material such as copper, and is in turn coupled to heat exchanger 80 of FIG. 1. This is controlled by circulating a coolant such as freon or liquid nitrogen through it. Interposed between heat exchanger 80 and substrate 602 of FIG. 2 is thermo-electric cooler-buffer 70. This is used to effect vernier control of the temperature. A heat spreader (which can be simply a thickened version of cooler-buffer 70's top plate or of substrate 602 (FIG. 2) is used to minimize spatial temperature variations on the interfacing surface of cooler-buffer 70.

The device under test views target 60 through IR window 12. In most cases, the device under test will not be capable of focusing on a target as close as would be presented by this device. In this case, an optical collimator 2000 would be used to make the target appear to be at infinity. The use of collimators for this purpose is well known in the practice of the art.

SUMMARY, RAMIFICATIONS AND SCOPE

Accordingly, the reader can see that the electrical signal to thermal image converter of this invention can be used to produce thermal images for simulation or training with infrared systems. It can use inputs from standard video recorders, video cameras, video-output infrared systems, or from computer generated images. Its wide span of temperatures, from cryogenic to thousands of degrees, its excellent spatial resolution, its temperature resolution, its range of frame rates, its spectral response and its ability to uniformly fill the field of view of the device under test set it apart from the earlier art.

While conferring all of the above advantages, the system is also robust, and can be manufactured economically. It does not depend on critical alignment or maintenance to obtain optimum performance. The electrical signal to thermal image converter is specifically designed to be tolerant of minor defects that would produce unacceptable blemishes in other simulator devices. Because it does not demand exotic materials or fabrication techniques, it is flexible enough to be tailored to many applications. The invention will work with all classes of infrared sensors, and does not require precision deflection or optical systems.

While my above description contains many specificities, these should not be construed as limitations on the scope of the invention, but rather as an exemplification of one preferred embodiment thereof. Many variations are possible. For example:

1. The carbon material in the target could be replaced with a conductive ceramic, metal, or other materials.
2. Either the thermo-electric cooler or the heat exchanger, or both can be eliminated in less demanding applications. The thermo-electric element can also be replaced with an electrical resistance heater.
3. IR window 12 can be replaced with a collimating lens. This would be appropriate in systems operating in a limited wavelength.
4. Electrostatic focus and/or deflection systems can be used instead of the magnetic systems described, or they can be used in addition to them.

Accordingly, the scope of the invention should not be determined by the embodiment illustrated, but by the appended claims and their legal equivalents.

I claim:

1. A device for converting electrical signals to thermal images, comprising a directed beam source of energy and means for varying the intensity, for focusing, and for deflecting said beam, and a reticulated target, having separate and independent elements each fortuitously placed upon and bonded to a substrate, said substrate coupled to a heat sink, said target converting the input energy from the beam to a thermal pattern emitting energy of another wavelength or form, viewed by the device under test on the side of said target being irradiated by said energy source.

2. A thermal image converter as in claim 1 wherein said energy source is an electron beam, generating the beam and directing it to the target within an evacuated envelope.

3. A thermal image converter as in claim 1 wherein said energy source is an electron beam, generating the beam in an evacuated envelope and directing it to the target external to said envelope.

4. A thermal image converter as in claim 1, wherein said energy source is a laser beam, with the target in the evacuated envelope, and the laser beam source external to the envelope.

5. A thermal image converter as in claim 1, wherein said energy source is a laser beam, with the laser beam source and the target in the evacuated envelope.

6. A thermal image converter as in claim 1, wherein said energy source is a laser beam, with neither the laser beam source nor the target in an evacuated envelope.

7. A thermal image converter as in claim 1, wherein the substrate is further coupled to a heat regulator.

8. A thermal image converter as in claim 1, wherein no ray of the directed beam source of energy impinges on the target at an angle perpendicular to the target.

9. A target for a thermal image converter as in claim 1, wherein the elements are overlapped from the perspective of the energy source.

10. A target for a thermal image converter comprising a substrate, a multiplicity of fiber elements fortuitously arrayed on said substrate, forming pixels thereon, and bonding means to attach said fibers to said substrate.

11. A target for a thermal image converter as in claim 10, wherein the fibers are carbon filaments.

12. A target for a thermal image converter as in claim 10, wherein the number of fibers exceeds the number of pixels.

* * * * *